(12) United States Patent
Lin

(10) Patent No.: US 8,028,430 B2
(45) Date of Patent: Oct. 4, 2011

(54) HEIGHT MEASUREMENT APPARATUS

(75) Inventor: Hou-Yao Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 213 days.

(21) Appl. No.: 12/464,887

(22) Filed: May 13, 2009

(65) Prior Publication Data

US 2009/0320304 A1 Dec. 31, 2009

(30) Foreign Application Priority Data

Jun. 26, 2008 (CN) .......................... 2008 1 0302366

(51) Int. Cl.
*G01B 5/02* (2006.01)
*G01B 3/22* (2006.01)
(52) U.S. Cl. ............................... 33/503; 33/832; 33/556
(58) Field of Classification Search .................... 33/1 M, 33/354, 503, 533, 551, 556, 832
See application file for complete search history.

(56) References Cited

U.S. PATENT DOCUMENTS

| | | | | |
|---|---|---|---|---|
| 2,173,464 A | * | 9/1939 | Aldeborgh et al. | 33/501.05 |
| 2,242,151 A | * | 5/1941 | Sisson | 33/556 |
| 2,541,535 A | * | 2/1951 | Neff | 33/838 |
| 3,561,125 A | * | 2/1971 | Zeidler | 33/503 |
| 3,599,339 A | * | 8/1971 | Adamczyk | 33/556 |
| 3,722,842 A | * | 3/1973 | Schweizer | 248/124.2 |
| 4,097,996 A | * | 7/1978 | Yamazawa et al. | 33/1 M |
| 4,133,112 A | * | 1/1979 | Matthiessen | 33/1 M |
| 4,324,049 A | * | 4/1982 | Blose | 33/199 B |
| 4,610,093 A | * | 9/1986 | Jarman et al. | 33/608 |
| 4,790,078 A | * | 12/1988 | Schneider | 33/503 |
| 4,958,440 A | * | 9/1990 | Pipes | 33/645 |
| 5,621,978 A | * | 4/1997 | Sarauer | 33/503 |
| 5,996,946 A | * | 12/1999 | Bailey | 248/125.1 |

FOREIGN PATENT DOCUMENTS

| | | |
|---|---|---|
| CN | 200975875 Y | 11/2007 |
| JP | 59073701 A * | 4/1984 |
| JP | 61022201 A * | 1/1986 |
| JP | 2011094989 A * | 5/2011 |
| WO | WO 9012277 A1 * | 10/1990 |

OTHER PUBLICATIONS

Derwent 2011-G77463 abstract of CN 201828221 U, titled "Tool for detecting length of cylinder sleeve and height of spigot, has vertical pole fixed and sleeved with connection block which is firmly connected with levelly set bracket", published May 11, 2011, Inventor: Liu et al.*

* cited by examiner

*Primary Examiner* — R. A. Smith
(74) *Attorney, Agent, or Firm* — Altis Law Group, Inc.

(57) ABSTRACT

A height measurement apparatus for measuring a height of a workpiece is provided. The height measurement apparatus includes a support member, a level bar and a height gauge. The level bar is installed on the support member and movable along a horizontal direction. The height gauge is installed on the level bar and vertically movable along a vertical direction relative to the level bar. The height gauge comprises a probe for contacting the workpiece, thereby detecting the position of the workpiece.

12 Claims, 2 Drawing Sheets

HEIGHT MEASUREMENT APPARATUS

BACKGROUND

1. Technical Field

The present invention relates to measuring tools and, particularly, to a height measurement apparatus.

2. Description of Related Art

In a process of manufacturing workpieces, heights of the workpieces are measured by a height measurement apparatus. Typically, the height measurement apparatus includes a support member and a height gauge installed on the support member. The height gauge is configured for contacting the workpieces and measuring the distance between two parallel surfaces of the workpiece, etc. However, the height gauge is only movable in a vertical direction relative to the support member, and immovable in a horizontal direction. When measuring different portions of a workpiece, the workpiece has to be moved relative to the height measurement apparatus many times. This is inconvenient.

Therefore, what is needed is a height measurement apparatus can overcome the above shortcomings.

BRIEF DESCRIPTION OF THE DRAWINGS

Many aspects of the present height measurement apparatus can be better understood with reference to the following drawings. The components in the drawing are not necessarily drawn to scale, the emphasis instead being placed upon clearly illustrating the principles of the present height measurement apparatus. Moreover, in the drawings, like reference numerals designate corresponding parts throughout the several views.

DETAILED DESCRIPTION

Embodiments of the present height measuring apparatus will now be described in detail below and with reference to the drawings.

Figure 1:
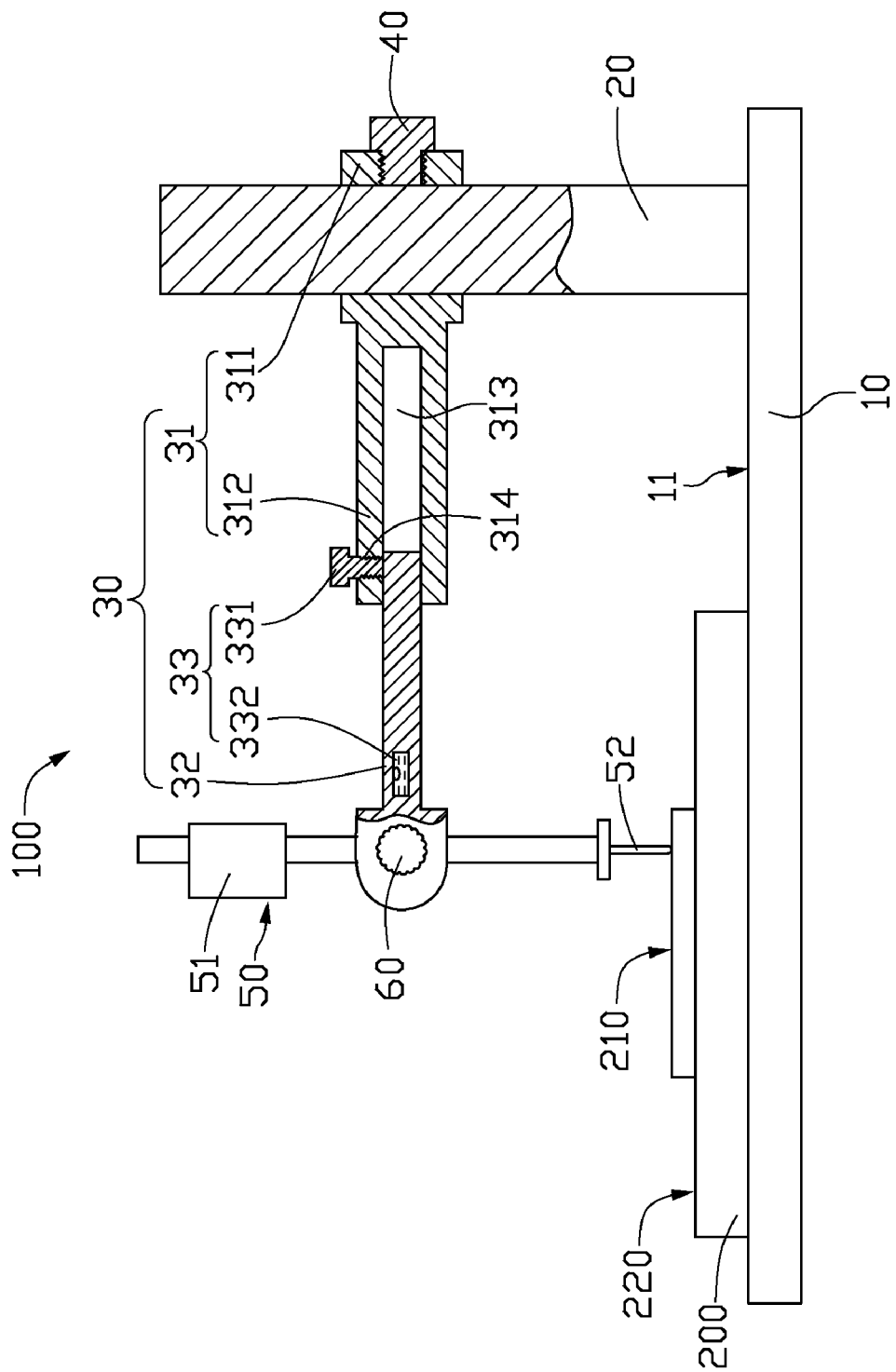
FIG. 1 is a schematic, partially cross-sectional view of a height measuring apparatus according to a first embodiment, a probe of the height measuring apparatus contacting a first surface of a workpiece.
Figure 2:
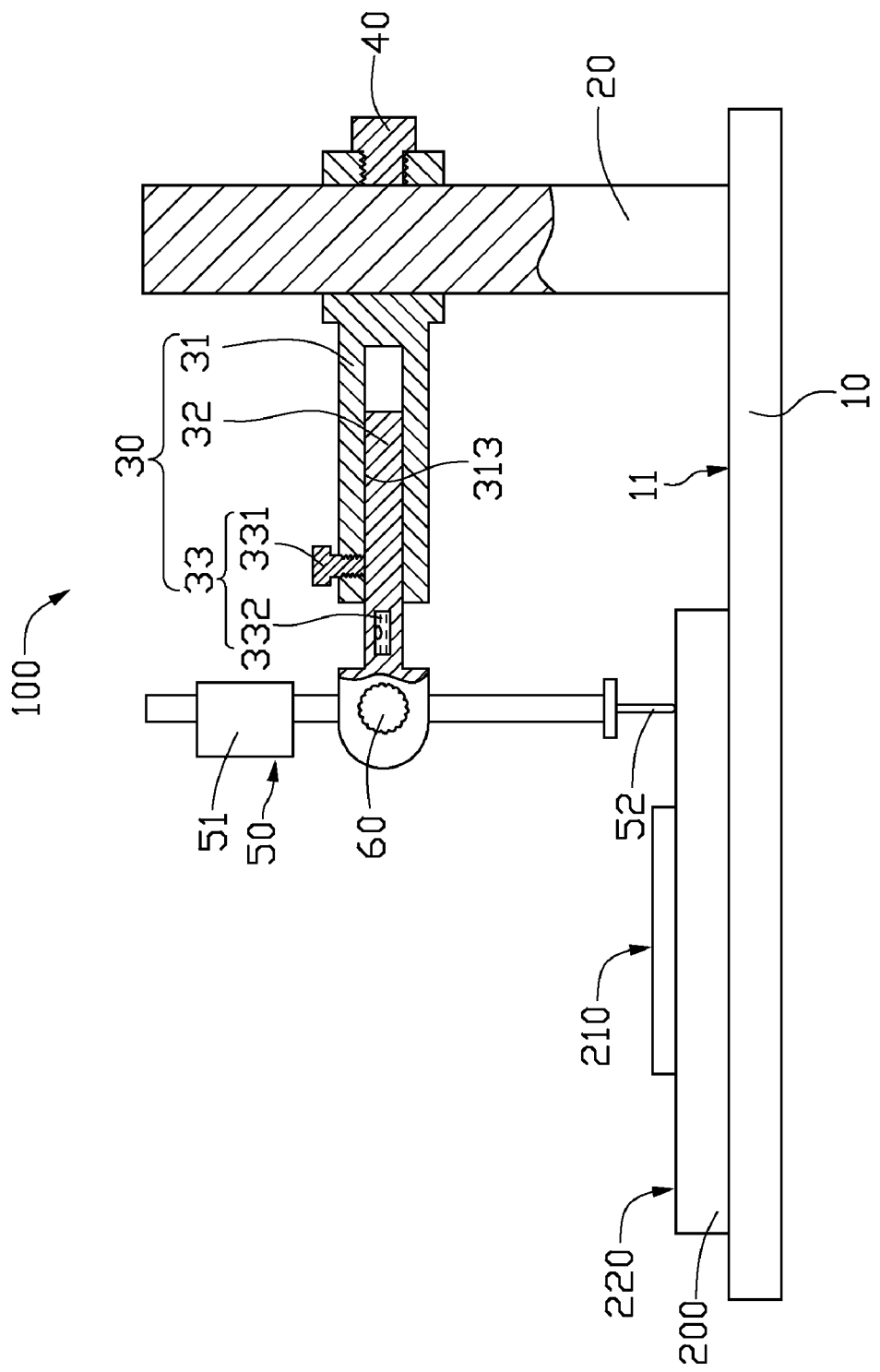
FIG. 2 is a schematic, partially cross-sectional view of the height measuring apparatus in FIG. 1, the probe of the height measuring apparatus contacting a second surface of the workpiece.

Referring to FIGS. 1 to 2, a height measuring apparatus 100 for measuring a workpiece 200 is provided in accordance with a first embodiment. In this embodiment, the workpiece 200 has a step structure. The workpiece 200 has a first surface 210 and a second surface 220 parallel to the first surface 210. The height measuring apparatus 100 includes a base 10, a support member 20, a level bar 30 and a height gauge 50.

The base 10 includes a placement surface 11 for placing the workpiece 200 thereon. The support member 20 is attached on the placement surface 11 of the base 10. In this exemplary embodiment, the support member 20 is rod-shaped and positioned perpendicular to the placement surface 11.

The level bar 30 is slidably installed on the support member 20. The level bar 30 includes a fixed portion 31, a movable portion 32 and a level adjusting portion 33.

The fixed portion 31 includes a tubular member 311 and a sleeve 312. The support member 20 is inserted in the tubular member 311. The tubular member 311 is movable in the vertical direction relative to the support member 20. A bolt 40 is inserted in an outer surface of the tubular member 311 and is in threaded engagement with the tubular member 311. The bolt 40 is configured for pressing the support member 20 with a proper force, thus fastening the tubular member 311 on the support member 20. The sleeve 312 extends from an outer surface of the tubular member 311 along a direction perpendicular to the central axis of the tubular member 311. The sleeve 312 has a sliding hole 313 defined therein oriented along the horizontal direction. The movable portion 32 is partly received in the sliding hole 313. The movable portion 32 is rod-shaped and slidable in the sliding hole 313.

The level adjusting portion 33 includes an adjusting bolt 331 and a bubble level tiltmeter 332. The bubble level tiltmeter 332 is positioned in the movable portion 32 away from the sliding hole 313. In this embodiment, the bubble level tiltmeter 332 is exposed for indicating level status of the movable portion 32. The sleeve 312 defines a screw hole 314 in an outer surface thereof. The adjusting bolt 331 engages in the screw hole 314 and presses the horizontal movable portion 32. When the movable portion 32 tilts because of gravity, the adjusting bolt 331 is screwed into the screw hole 314 to provide pressure to the movable portion 32 to correct the movable portion 32 in the horizontal condition.

The height gauge 50 is rod shaped and is perpendicularly inserted in the movable portion 32 and slidable in the movable portion 32. A probe 52 is installed at one distal end of the height gauge 50 for contacting the workpiece 200. The height gauge 50 includes a position detector 51 for detecting positions of the probe 52. A bolt 60 is inserted in a side surface of the movable portion 32 and in threaded engagement with the movable portion 32 for pressing height gauge 50 tightly against the movable portion 32. When the height gauge 50 moves to a certain position, the bolt 60 is screwed towards the height gauge 50 to press the height gauge 50 tightly against the movable portion 32.

In operation, the workpiece 200 is positioned on the placement surface 11 of the base 10. The first surface 210 and the second surface 220 are arranged facing the height gauge 50. In this embodiment, the first surface 210 is at a higher position than the second surface 220. Then the movable portion 32 is moved along the horizontal direction so that the height gauge 50 is moved along with the movable portion 32 to a position over the first surface 210. The bolt 331 is screwed in the screw hole 314 towards the movable portion 32 to press the movable portion 32, thereby adjusting the movable portion 32 in the horizontal orientation. As shown in FIG. 1, the height gauge 50 is moved along the vertical direction to make the probe 52 contact the first surface 210. The bolt 60 is screwed towards the height gauge 50 to fix the position of the height gauge 50. A first position of the probe 52 is detected by the position detector 51.

Then the bolt 60 is screwed away from the height gauge 50 and the height gauge 50 is moved away from the first surface 210 along the vertical direction. Then the bolt 331 is screwed away from the movable portion 32 and the movable portion 32 is moved along the horizontal direction so that the height gauge 50 is moved along with the movable portion 32 to a position over the second surface 210. The bolt 331 is screwed in the screw hole 314 towards the movable portion 32 to press the movable portion 32, thereby adjusting the movable portion 32 in the horizontal orientation. As shown in FIG. 2, the height gauge 50 is moved along the vertical direction to make the probe 52 contact the second surface 220. The bolt 60 is screwed towards the height gauge 50 to fix the height gauge 50 in position. A second position of the probe 52 is detected by the position detector 51. Then a height difference between the first and second position of the probe 52 is calculated, thereby obtaining a height between the first surface 210 and the second surface 220 of the workpiece 200.

In the embodiment of this disclosure, the probe 52 of the height measuring apparatus 100 is movable in both the horizontal direction and the vertical direction. Therefore, the height measuring apparatus 100 can detect different positions of the workpiece 200 without moving the workpiece 200. This is convenient for measuring the height of the workpiece 200.

It is understood that the above-described embodiment are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A height measurement apparatus for measuring a height of a workpiece, comprising:
    a support member, wherein the support member is rod-shaped and is oriented along a vertical direction;
    a level bar installed on the support member, the level bar being movable along a horizontal direction, the level bar comprising a tubular member, a sleeve, and a movable portion, the support member being inserted in the tubular member, the sleeve being installed on an outer surface of the tubular member, the sleeve defining a sliding hole therein oriented along the horizontal direction, the sliding hole being a blind hole, the movable portion being received in the sliding hole and horizontally slidable along the sliding hole; and
    a height gauge inserted in the movable portion of the level bar and vertically movable along a vertical direction relative to the level bar, the height gauge comprising a probe for contacting the workpiece.

2. The height measurement apparatus of claim 1, further comprising a first bolt inserted through an outer wall of the tubular member and in threaded engagement with the tubular member for pressing the support member tightly against the tubular member.

3. The height measurement apparatus of claim 2, further comprising a second bolt inserted through an outer wall of the sleeve and in threaded engagement with the sleeve for pressing the movable portion tightly against the sleeve.

4. The height measurement apparatus of claim 3, further comprising a third bolt inserted through the movable portion and in threaded engagement with the movable portion for pressing the height gauge tightly against the movable portion.

5. The height measurement apparatus of claim 3, further comprising a bubble level tiltmeter positioned in the movable portion for indicating level status of the movable portion.

6. The height measurement apparatus of claim 5, wherein the bubble level tiltmeter is exposed.

7. A height measurement apparatus for measuring a height of a workpiece, comprising:
    a sleeve having a sliding hole defined therein, the sliding hole being a blind hole oriented along a horizontal direction;
    a movable portion being partly received and slidable in the sliding hole; and
    a height gauge mechanically coupled to the movable portion and vertically movable relative to the movable portion, the height gauge comprising a probe for contacting the workpiece.

8. The height measurement apparatus of claim 7, further comprising a rod-shaped member which is oriented along the vertical direction, the sleeve being installed on the rod-shaped member and movable along the rod-shaped member.

9. The height measurement apparatus of claim 7, further comprising a first bolt inserted through an outer wall of the sleeve and in threaded engagement with the sleeve for pressing the movable portion tightly against the sleeve.

10. The height measurement apparatus of claim 9, further comprising a second bolt inserted in the movable portion and in threaded engagement with the movable portion for pressing the height gauge tightly against the movable portion.

11. The height measurement apparatus of claim 7, further comprising a bubble level tiltmeter positioned in the movable portion for indicating level status of the movable portion.

12. The height measurement apparatus of claim 11, wherein the bubble level tiltmeter is exposed.

* * * * *